United States Patent [19]
Funck et al.

[11] Patent Number: 5,502,620
[45] Date of Patent: Mar. 26, 1996

[54] GROUNDED IC CARD

[75] Inventors: Gordon W. Funck, Naperville; Harold K. Lang, Fox River Grove, both of Ill.

[73] Assignee: Molex Incorporated, Lisle, Ill.

[21] Appl. No.: 212,458

[22] Filed: Mar. 11, 1994

[51] Int. Cl.[6] .................................................. H05K 5/00
[52] U.S. Cl. .......................... 361/753; 361/737; 361/796; 439/44
[58] Field of Search ................................... 361/753, 737, 361/752, 785, 741, 748, 796; 439/44, 74; 174/260

[56] References Cited

U.S. PATENT DOCUMENTS

| | | | |
|---|---|---|---|
| 4,872,091 | 10/1989 | Maniwa et al. | 361/395 |
| 4,955,817 | 9/1990 | Sugai | 439/60 |
| 5,205,751 | 4/1993 | Schwartz et al. | 439/86 |
| 5,313,364 | 5/1994 | Dmori et al. | 361/737 |
| 5,357,402 | 10/1994 | Anhalt | 361/753 |

FOREIGN PATENT DOCUMENTS

0406610A2  2/1991  European Pat. Off. ....... G06K 19/06

OTHER PUBLICATIONS

AMP Customer Drawing No. 557713, p. 1 of 2, Rev. AA.
Fujitsu Product Bulletin (date unknown).

Primary Examiner—Leo P. Picard
Assistant Examiner—Y. Whang
Attorney, Agent, or Firm—Stacey E. Caldwell

[57] ABSTRACT

An IC card includes a circuit board having a generally planar substrate with at least one electrical component mounted thereon. A receptacle including terminals is mounted at an edge of the circuit board. A pair of cover panels sandwich the circuit board therebetween. At least one conductive ground clip holds the cover panels in assembled condition sandwiching the circuit board therebetween. A ground circuit on the circuit board engages the grounding clip. At least a portion of the grounding clip is exposed exteriorly of the IC card for engaging an appropriate ground on an appropriate mating electrical apparatus.

10 Claims, 3 Drawing Sheets

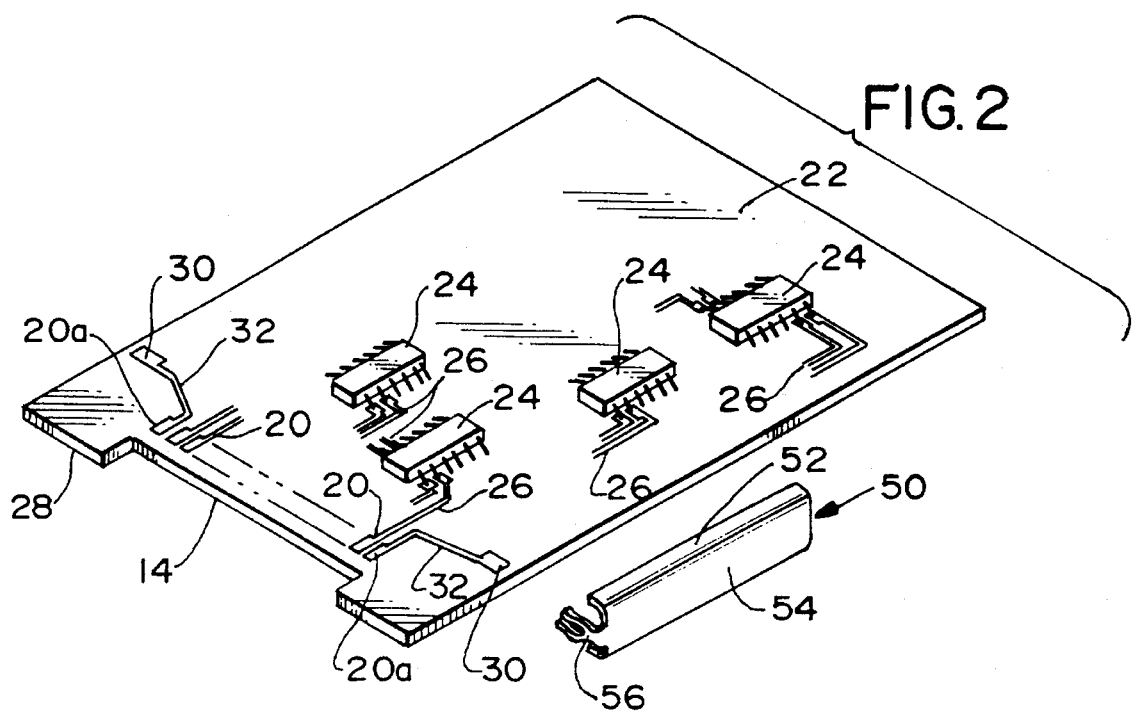
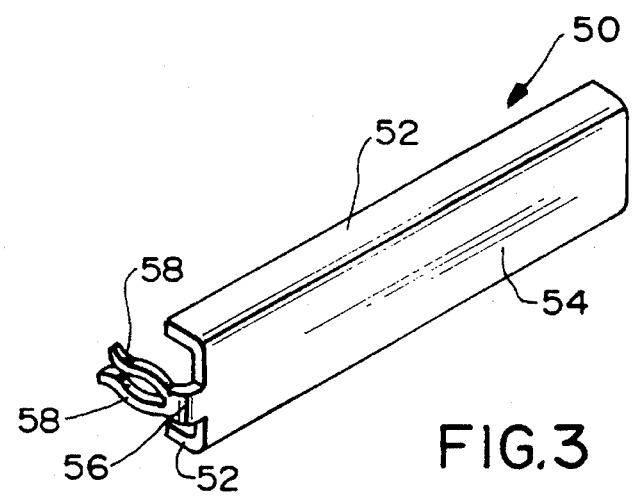

GROUNDED IC CARD

FIELD OF THE INVENTION

This invention generally relates to the art of IC cards and, particularly, to an IC card which has a novel conductive grounding clip which also functions to hold the IC card in assembled condition.

BACKGROUND OF THE INVENTION

Generally, IC cards or packs, such as memory cards, are data input devices which are electrically connected to an electronic apparatus or storage device, such as a word processor, personal computer or other electronic apparatus. The data stored in the IC card is transferred to the electronic apparatus. Such cards are portable instruments which are readily inserted and extracted from a connector which is used for removably coupling the card to a printed circuit board, for instance.

An IC card typically comprises a generally rectangular frame which includes an opening in either a top surface or a bottom surface thereof or, in some constructions, in both surfaces. The opening receives a circuit board, and a panel or cover closes the opening and encloses the circuit board within the frame. In other IC cards, a separate frame is not used, and the circuit board simply is sandwiched between a pair of cover panels. In either configuration, the assembly is typically and most commonly held together by an adhesive material.

The circuit board of the IC card conventionally includes a generally planar substrate with at least one electrical component mounted thereon. The electrical component(s) may include semi-conductor devices, integrated circuits, batteries or the like.

One of the problems in manufacturing IC cards as described above is that the extensive use of adhesives does not lend itself to efficient automation or robotic processing. The adhesives are difficult to apply and are, generally, very messy in use.

Another, somewhat unrelated problem involves the build-up of electrical charges in the IC card. Specifically, charges are generated in the IC card during handling since the card generally is a portable instrument often carried on a human body. When a card bearing charges is inserted into an electronic apparatus or the connector thereof, the charges flow to the electronic apparatus through the connecting terminals of the connector. The charges can result in damage to or ultimate failure of the integrated circuits or other circuit elements on the card as well as the electronic apparatus itself.

Consequently, structures have been embodied in IC cards and/or their mating connectors for removing static electrical charges stored in the cards. The card typically is grounded to the electronic apparatus. To facilitate grounding and to provide effective static protection, IC cards have been equipped with extraneous internal grounding components which typically are soldered to the circuit board of the card, assembled within the card and coupled to a conductive cover panel which, in turn, is grounded to the electrical apparatus. These procedures involve secondary operations (i.e. in addition to assembling the card components themselves) and significantly increases the costs of manufacturing the cards.

The present invention is directed to solving the above somewhat unrelated problems by providing a singular conductive grounding clip which performs a dual function of holding the IC card components in assembled condition without the use of adhesives and also serves as a grounding means for the IC card.

SUMMARY OF THE INVENTION

An object, therefore, of the invention is to provide a new and improved IC card of the character described above and including a novel conductive grounding clip.

In the exemplary embodiment, the invention is incorporated in an IC card which includes a circuit board having a generally planar substrate with at least one electrical component mounted thereon. A receptacle, including terminals, is mounted at an edge of the circuit board. A pair of cover panels sandwich the circuit board therebetween and leave at least a mating face of the receptacle exposed for connection to an appropriate mating electrical apparatus.

The invention contemplates the provision of at least one conductive grounding clip having means for holding the cover panels in assembled condition sandwiching the circuit board therebetween. A ground circuit means are provided on the circuit board for engaging the grounding clip. At least a portion of the grounding clip is exposed exteriorly of the IC card for engaging an appropriate ground means on the mating electrical apparatus.

As disclosed herein, the cover panels are fabricated of non-conductive material. The conductive grounding clip is elongated and channel-shaped for embracing adjacent side edge portions of the cover panels. The cover panels are generally planar and include recessed areas at the edge portions thereof for receiving leg portions of the channel-shaped grounding clip to maintain the leg portions generally flush with the planes of the cover panels. In the preferred embodiment, one of the grounding clips is provided at each opposite side of the IC card.

Still further, the channel-shaped grounding clip defines a bight portion joining its leg portions. A contact portion projects inwardly of the bight portion for engaging the ground circuit means on the circuit board. The contact portion is bifurcated to provide a pair of contacts for engaging opposite sides of the circuit board. Preferably, the grounding clip is a stamped and formed sheet metal component having a generally U-shaped cross section, with the contact portion being bent inwardly at one end of the bight portion of the clip.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an exploded perspective view of the circuit board and the conductive grounding clip of the IC card;

FIG. 3 is a perspective view of the grounding clip;

DETAILED DESCRIPTION OF THE PREFERRED EMBODIMENT

Figure 1:
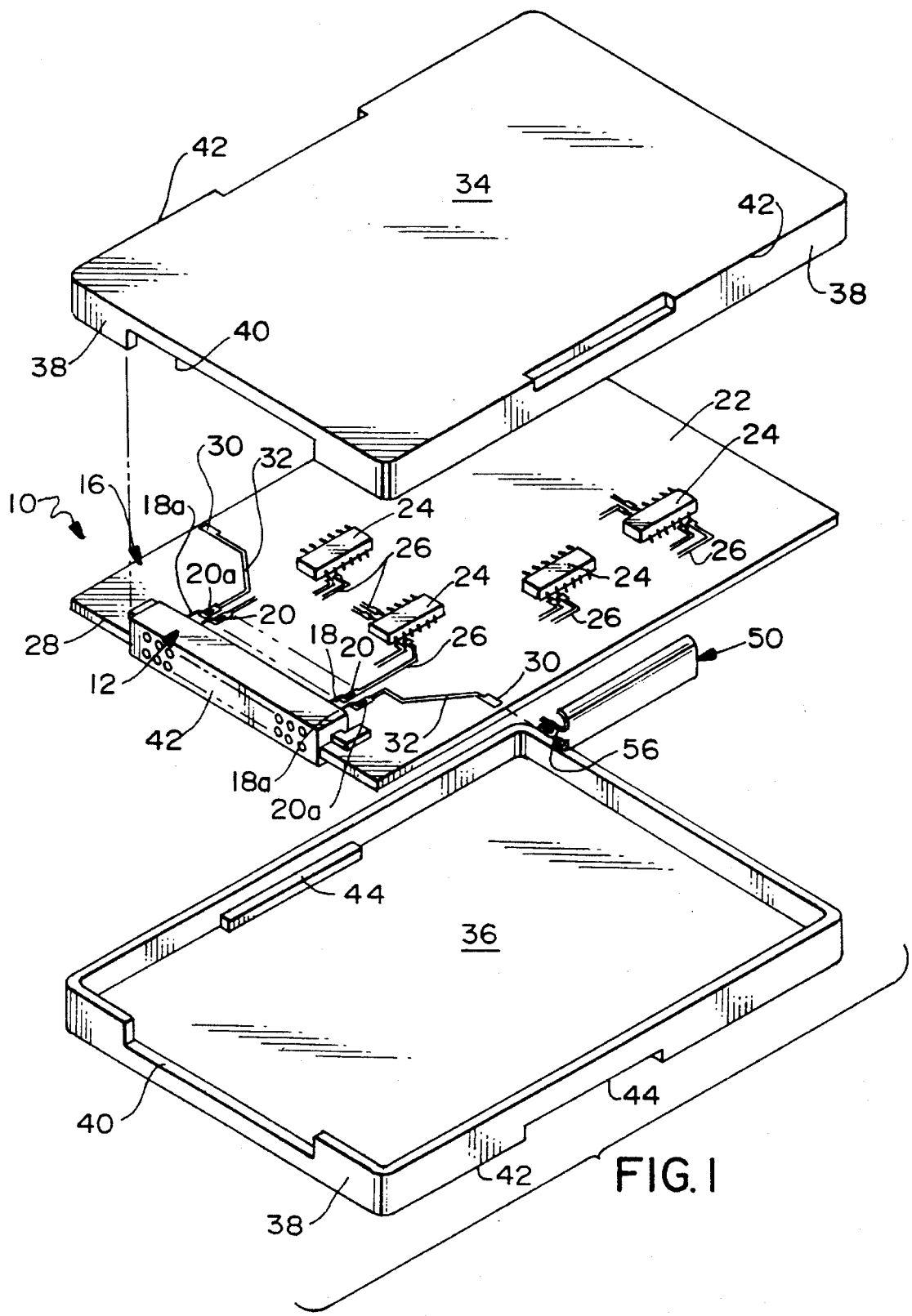
FIG. 1 is an exploded perspective view of an IC card embodying the concepts of the invention.

Referring to the drawings in greater detail, and first to FIG. 1, the invention is embodied in an IC card, generally designated 10, which is provided as a data input device, such as a memory card, for connection to an electronic apparatus or storage device, such as a word processor, personal computer or other electronic apparatus (not shown). The data stored in memory card 10 is transferred to the electronic apparatus through the terminals within an elongated receptacle 12 which is edge mounted within a cut-out area 14 (FIG. 2) of a circuit board, generally designated 16.

Receptacle 12 is elongated and mounts a plurality of input terminals 18. The terminals mechanically and electrically engage contact pads 20 on a circuit substrate 22 of circuit board 16. Various electrical components or circuit elements 24 are surface mounted on substrate 22, along with circuit traces 26 leading to contact pads 20 at the leading or front edge 28 of the substrate. This edge is coupled to elongate receptacle 12, and the receptacle is interconnectable with an electrical connector apparatus, such as a header connector on a printed circuit board of the electronic apparatus to which data stored in circuit board 16 is transferrable. For purposes to be described in greater detail hereinafter, ground circuit means are provided on substrate 22 of circuit board 16 and includes at least one ground pad 30 and corresponding ground trace 32 electrically coupled to ground pad 20a engageable by ground terminal 18a of receptacle 12. FIG. 1 shows a memory card with two such grounding circuit means.

The above description of circuit board 16 is generally conventional, except for the particular ground means, and, consequently, the depiction of the circuit board is not in the utmost detail. However, it should be understood that electrical components or circuit elements 24 may comprise semi-conductor devices, batteries, and other parts of integrated circuits from which stored data is transferred to the electronic apparatus.

Still referring to FIG. 1, IC card 10 includes a pair of cover panels 34 and 36 which sandwich circuit board 16 therebetween. The panels have peripheral flanges 38 which space the panels from circuit board 16, along with open areas 40 at the front of the panels for accommodating elongated receptacle 12, leaving at least a mating face 42 of the receptacle exposed for connection to the appropriate mating electronic apparatus, such as by way of a header connector mounted on a main circuit board within the apparatus. Lastly, for purposes described hereinafter, each side edge 42 of each panel 34 and 36 is provided with a recessed area 44.

Without substantially repeating the "Background", above, covers, such as cover panels 34 and 36, heretofore have been secured together, sandwiching the circuit board therebetween, by the use of adhesives. Adhesives typically involve expensive, usually manual, assembly operations. In addition, for grounding purposes, the cover panels often have been fabricated of conductive material, again involving increased costs. Cover panels 34 and 36, herein, are inexpensively fabricated of non-conductive material, such as plastic or the like. No adhesives are used to assemble the cover panels to circuit board 16. Instead, the invention contemplates the provision of at least one conductive grounding clip, generally designated 50, for performing the dual function of facilitating assembly of IC card 10 and also facilitating grounding the card to an extraneous appropriate ground means exteriorly of the card, such as on the mating electrical apparatus or the connector thereof.

More particularly, as best seen in FIGS. 2 and 3, the conductive grounding clip 50 is channel-shaped to define an elongated component which is generally U-shaped in cross section. The clip can be conveniently, efficiently and inexpensively fabricated as a stamped and formed sheet metal component. As so formed, the channel shape of the clip defines a pair of leg portions 52 joined by a bight portion 54. The grounding clip also has a contact portion 56 bent inwardly of bight portion 54. The contact portion is bifurcated to define a pair of contacts 58 for engaging ground pads 30 on one or both sides of substrate 22 of circuit board 16. Therefore, grounding clips 50 are-coupled through ground traces 32 and ground pads 20a to ground terminals 18a of receptacle 12.

Figure 4:
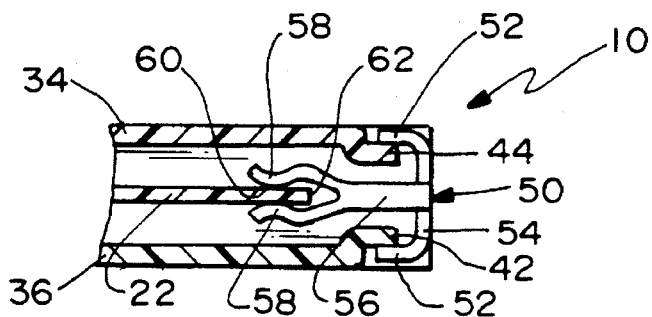
FIG. 4 is a fragmented vertical section through a side edge area of the IC card in assembled condition and illustrating an end elevational view of the grounding clip.

Referring to FIG. 4, in assembled condition of circuit board 10, contacts 58 of each grounding clip 50 define a mouth 60 for receiving a side edge 62 of substrate 22 in the area of ground pad(s) 30. Clip 50 is stamped and formed so that mouth 60 between contacts 58 has a width less than the thickness of substrate 22. With the clip being fabricated of sheet metal material, contacts 58, in essence, will have inherent resiliency for applying positive contact forces on ground pads 30.

Figure 6:
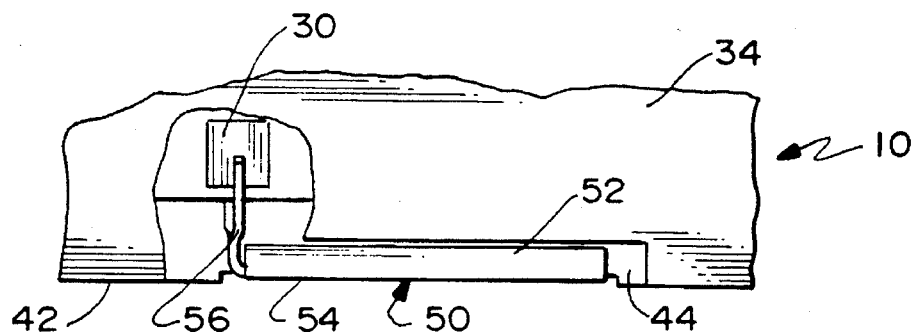
FIG. 6 is a fragmented top plan view, on an enlarged scale and partially cut away, of the area of the IC card incorporating the grounding clip.
Figure 5:
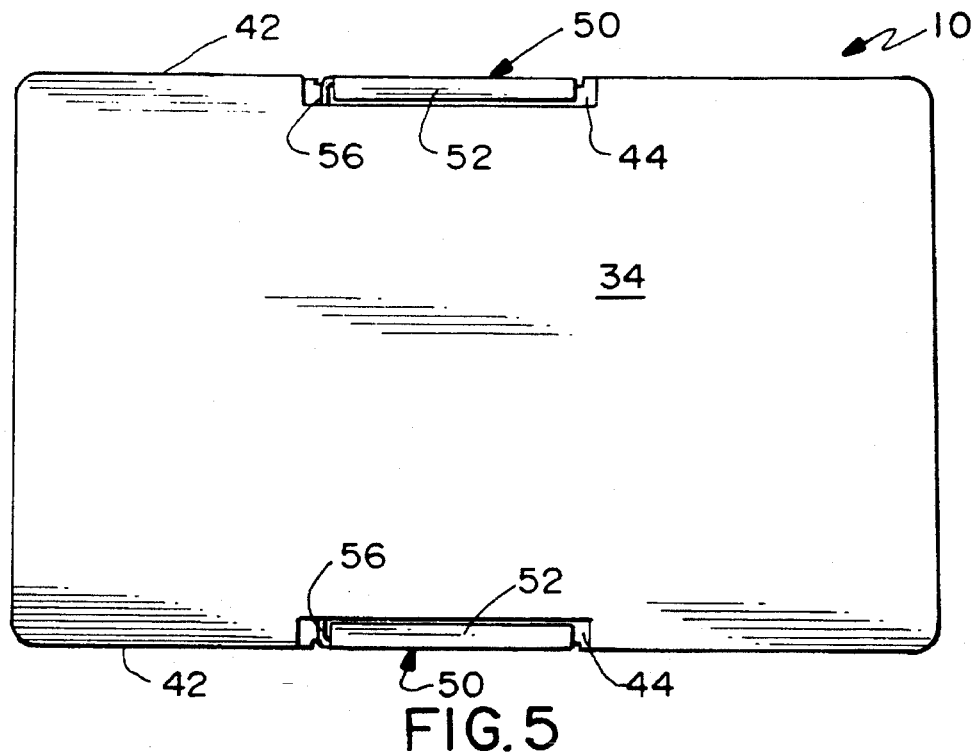
FIG. 5 is a top plan view of an IC card utilizing two of the grounding clips of the invention.

FIGS. 5 and 6 show how conductive grounding clips 50, in assembly, are mounted within recessed areas 44 of cover panels 34 and 36. This also can be seen in FIG. 4. When the grounding clips are assembled as seen in FIG. 4, leg portions 52 of the grounding clips securely grip the cover panels within recessed areas 44. More particularly, when cover panels 34 and 36 are assembled together sandwiching circuit board 16 therebetween, peripheral flanges 38 (FIG. 1), in essence, define the spacing of recessed areas 44 as seen in FIG. 4. Grounding clips 50 are dimensionally formed such that leg portions 52 are spaced somewhat less than the spacing of recessed areas 44. Therefore, the grounding clips, through leg portions 52, securely grip and somewhat clamp cover panels 34 and 36 together in a generally rigid assembled structure, with a grounding clip on each opposite side of the IC card as shown in FIG. 5. FIG. 6 also shows how contacts 58 of the grounding clips engage ground pads 30 in the assembled condition of the IC card.

In assembly, leg portions 52 of the grounding clips are generally flush with planar cover panels 34 and 36 as shown best in FIG. 4. Bight portions 54 of the clips are exposed at edges 42 of the cover panels for engaging an appropriate ground means on the mating electrical apparatus or the connector thereof. For instance, as is well known in the art, IC card 10 is insertable into a header connector with the side edges of the IC card riding within a pair of slots or channels facing inwardly at opposite sides of the header connector. It is known to provide ground means within these channels and which grounding clips 50 are engageable. The engagement should be made prior to terminals 20 engaging the terminals of the mating electrical apparatus or header connector so that the static charges are discharged prior to mating of the terminals. Still further, ground terminals 18a may be made longer than input terminals 18 so that the IC card also is grounded to the mating connector prior to engagement of the respective input terminals.

From the foregoing, it can be understood that conductive grounding clips 50 perform dual functions within the structure of IC card 10, namely: (1) facilitating grounding of the IC card to remove static electrical charges therefrom, and (2) facilitating assembly of the entire IC card, particularly without the use of adhesives. In addition, the grounding clips can be removed to allow access to the inside of the card, an advantage unavailable with prior IC cards assembled with permanent adhesives.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In an IC card which includes a circuit board having a generally planar substrate with at least one electrical component mounted thereon, a receptacle including terminals mounted at an edge of the circuit board, and a pair of generally planar cover panels sandwiching the circuit board therebetween and leaving at least a mating face of the receptacle exposed for connection to an appropriate mating electrical apparatus, wherein the improvement comprises at least one elongated, channel-Shaped conductive grounding clip embracing adjacent side edge portions of the cover panels and including means for holding the cover panels in assembled condition, the cover panels including recessed areas at said edge portions for receiving leg portions of the grounding clip to maintain the leg portions generally flush with the planes of the cover panels, a ground circuit means on the circuit board for engaging the grounding clip, and at least a portion of the grounding clip being exposed exteriorly of the IC card for engaging an appropriate ground means on the mating electrical apparatus.

2. In an IC card as set forth in claim 1, wherein said cover panels are fabricated of non-conductive material.

3. In an IC card as set forth in claim 1, wherein said channel-shaped grounding clip defines a bight portion joining said leg portions, and including a contact portion projecting inwardly of the bight portion for engaging the ground circuit means on the circuit board.

4. In an IC card as set forth in claim 3, wherein said contact portion is bifurcated for engaging opposite sides of the circuit board.

5. In an IC card as set forth in claim 3, wherein said grounding clip is a stamped and formed sheet metal component having a generally U-shaped cross section with said contact portion being bent inwardly at one end of said bight portion.

6. In an IC card as set forth in claim 1, including one of said grounding clips at each opposite side of the IC card.

7. In an IC card which includes a circuit board having a generally planar substrate with at least one electrical component mounted thereon and defining opposite sides and opposite ends thereof, a receptacle including terminals mounted at one end of the circuit board, and a pair of generally planar cover panels sandwiching the circuit board therebetween, wherein the improvement comprises:

said cover panels are fabricated of non-conductive material, and a pair of elongated, channel-shaped conductive grounding clips are mounted at opposite sides of the circuit board and engaging ground circuit means thereon, the grounding clips embracing adjacent side edge portions of the cover panels and including means for holding the cover panels in assembled condition, wherein the cover panels include recessed areas at said edge portions for receiving leg portions of the channel-shaped grounding clips to maintain the leg portions generally flush with the planes of the cover panels.

8. In an IC card as set forth in claim 7, wherein each of said channel-shaped grounding clips defines a bight portion joining said leg portions, and including a contact portion projecting inwardly of the bight portion for engaging the ground circuit means on the circuit board.

9. In an IC card as set forth in claim 8, wherein said contact portion of each grounding clip is bifurcated for engaging opposite sides of the circuit board.

10. In an IC card as set forth in claim 8, wherein each grounding clip is a stamped and formed sheet metal component having a generally U-shaped cross section with said contact portion being bent inwardly at one end of said bight portion.

* * * * *